US008171085B1

(12) United States Patent
Tevanian, Jr.

(10) Patent No.: US 8,171,085 B1
(45) Date of Patent: May 1, 2012

(54) METHODS AND APPARATUSES FOR AUTHENTICATING ELECTRONIC MESSAGES

(75) Inventor: Avadis Tevanian, Jr., Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 1032 days.

(21) Appl. No.: 11/040,263

(22) Filed: Jan. 19, 2005

(51) Int. Cl.
*H04L 9/32* (2006.01)
*G06F 15/16* (2006.01)

(52) U.S. Cl. ......................................... 709/206; 713/176
(58) Field of Classification Search .................. 709/206; 713/168–180
See application file for complete search history.

(56) References Cited

U.S. PATENT DOCUMENTS

| 6,247,127 | B1 * | 6/2001 | Vandergeest | 713/100 |
|---|---|---|---|---|
| 6,370,249 | B1 * | 4/2002 | Van Oorschot | 380/277 |
| 6,587,837 | B1 * | 7/2003 | Spagna et al. | 705/26 |
| 6,986,049 | B2 * | 1/2006 | Delany | 713/176 |
| 7,162,738 | B2 * | 1/2007 | Dickinson et al. | 726/14 |
| 7,174,368 | B2 * | 2/2007 | Ross, Jr. | 709/207 |
| 7,313,700 | B2 * | 12/2007 | Delany | 713/176 |
| 7,603,422 | B2 * | 10/2009 | Murphy et al. | 709/206 |
| 2005/0085931 | A1 * | 4/2005 | Willeby | 700/89 |
| 2005/0289644 | A1 * | 12/2005 | Wray | 726/5 |
| 2006/0031319 | A1 * | 2/2006 | Nelson et al. | 709/206 |

OTHER PUBLICATIONS

Yahoo! Mail Anti-Spam Resource Center, "Domain Keys: Proving and Protecting Email Sender Identity", Yahoo! Inc. 5 pages.
Mark Delany, "Domain-based Email Authentication Using Public-Keys Advertised in the DNS(DomainJeys)" Yahoo! Inc. Aug. 2004, 77 pages.

* cited by examiner

*Primary Examiner* — Glenton B Burgess
*Assistant Examiner* — Shirley Zhang
(74) *Attorney, Agent, or Firm* — Blakely, Sokoloff, Taylor & Zafman LLP

(57) ABSTRACT

Methods and systems and machine readable media for processing email and other electronic messages. In one exemplary embodiment, a method includes storing a plurality of domain names, each of which correspond to a portion of a full email address; receiving a first email; determining whether a sender address specified by the first email is within a domain specified by the plurality of domain names; determining whether the first email is authentically from an entity which controls the domain specified by the plurality of domain names if the sender address is within the domain; and presenting an indication of nonauthenticity if the first email is not authentically from the entity.

44 Claims, 11 Drawing Sheets

METHODS AND APPARATUSES FOR AUTHENTICATING ELECTRONIC MESSAGES

BACKGROUND OF THE INVENTION

The widespread use of the Internet as an electronic communication medium has made the use of electronic mail, otherwise known as email, very common among users of data processing systems, including general purpose computer systems, cellular telephones, Internet appliances, and other types of data processing systems. While email provides for the rapid exchange of text and other information through a network, it does present certain problems to users. One such problem is Internet spam which is annoying, distracting, and burdensome to networks. The potentially more troubling problem is an email spoofing scam. A spoofing scam has the potential to inflict serious losses of data and direct monetary losses due to fraud and other schemes. A classic example of a spoofing scam is the creation of email messages that appear to be emails sent from legitimate sources. A spoofing scam will typically attempt to fool a user into submitting personal, financial, or password data to the originator of the scam, allowing them to use such data for currency transfers and other fraudulent and potentially criminal schemes. Typically, a spoofing scam involves an email which arrives with the spoofed company's logo and email layout and requests the receiver to enter personal, financial (e.g. a credit card number and expiration date), or password data. Alternatively, these spoofed emails may direct the user through a link to a spoofed web page which is a fake representation of a legitimate web page, such as a web page of amazon.com or a bank's web page, and the spoofed web page asks the user to enter personal, financial or password data or other types of data sought by the organizers of the scam.

The organizers of these types of scams use sophisticated techniques to make it difficult to determine the originator of the email. They often will make the email appear as if it came from a legitimate source, such as amazon.com or a bank's website, or a bank. By faking the identity of a legitimate source, the scammers are attempting to fool users into believing that the email is authentic and actually from the legitimate owner, such as amazon.com or a bank or other organizations which are well known to users. In response to these scams, a working group known as the anti-phishing working group has been established; this working group now has a website at www.antiphishing.com. This working group has identified certain solutions to address the threat of spoofing scams. One of these solutions involves the use of digitally signed email. However, such solutions will often require users, such as users at a home, to have a relatively high level of sophistication necessary to install the authentication data and to maintain the authentication data.

Thus it is desirable to provide a simple-to-use solution to guard against email spoofing.

SUMMARY OF THE DESCRIPTION

Methods, apparatuses, systems and software media for processing emails or other electronic messages are described herein.

In one exemplary embodiment described herein, the method includes storing a plurality of domain names, each of which correspond to a portion of a full email address, receiving a first email, determining whether a sender address specified by the first email is within a domain specified by the plurality of domain names, determining whether the first email is authentically from an entity which controls the domain if the sender address is within the domain, and optionally presenting an indication of nonauthenticity if the first email is not authentically from the entity or an indication of authenticity. In a particular implementation of this embodiment, digital certificates may be included with authentic emails, and these digital certificates may be decrypted with cryptographic keys, such as a public key of the domain which has control of the domain name. A list of domains and their corresponding keys may be stored locally. Further, if the sender address is within the domain and if the first email does not include data which is used to verify the authenticity, such as a digital certificate, then the method includes optionally presenting an indication of nonauthenticity.

In an embodiment, the foregoing method may be implemented in a manner which is relatively user friendly by distributing public keys for the domains which desire to have their emails authenticated, with the list of domains as part of a distribution of email software and/or operating system (OS) software or other types of software, such as instant messaging software. A user can merely install (e.g. install this information on a local storage) the email software and/or operating system software or other types of software, such as instant messaging software, and the necessary data, such as the public keys for a corresponding list of domains, so that the domains desiring to protect their email will already have installed on a user's system the necessary software and data, thereby allowing the users to be automatically protected without any additional effort or operations required by the user.

According to another aspect of the present invention, an exemplary method includes storing a plurality of digital certificates and/or other information (e.g. public keys for each domain), each associated with a corresponding domain portion of an email address, and distributing copies of software for storage on a storage medium, wherein the software includes a copy of the plurality of digital certificates and/or other information and further includes executable computer program instructions for using the plurality of digital certificates and/or other information. The public keys are used in decrypting received digital certificates or other data which are embedded within or otherwise associated with emails received from an address within the domain protected by the digital certificate.

BRIEF DESCRIPTION OF THE DRAWINGS

The present invention is illustrated by way of example and not limitation in the figures of the accompanying drawings in which like references indicate similar elements.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

Figure 1:
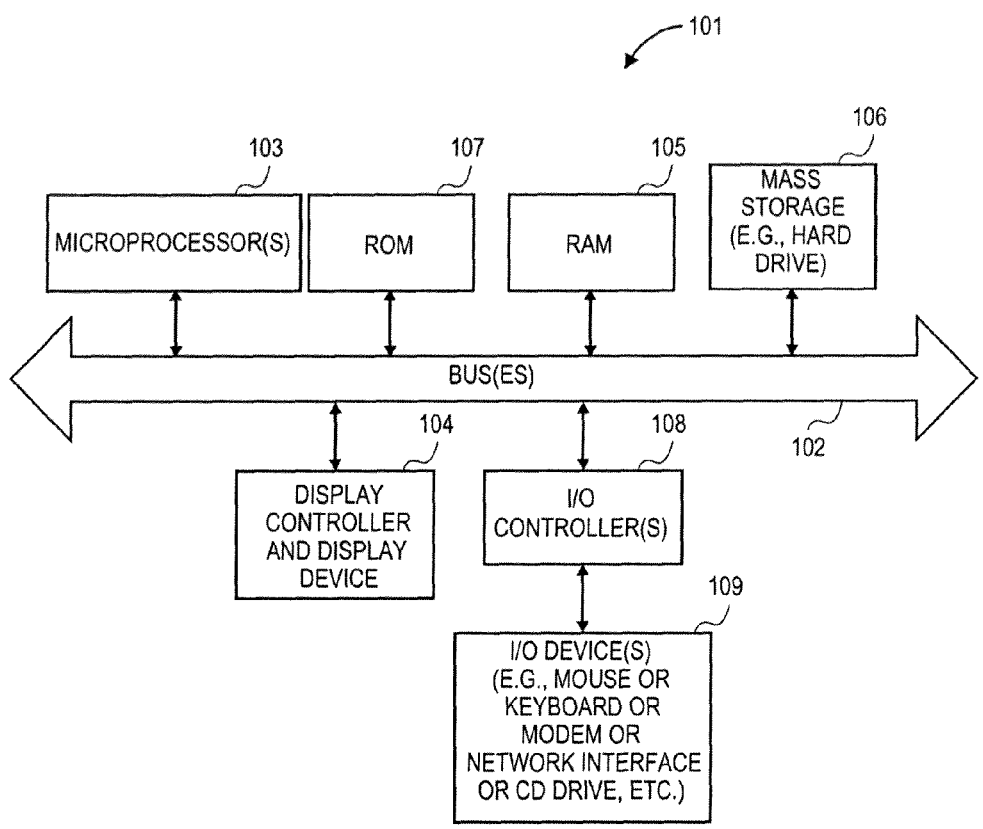
FIG. 1 shows an example of a data processing system which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems (e.g. personal digital assistants, cellular telephones, handheld computers, Internet appliances, etc.) which have fewer components or perhaps more components may also be used with the present invention. The computer system of FIG. 1 may, for example, be a Macintosh computer from Apple Computer, Inc.

As shown in FIG. 1, the computer system 101, which is a form of a data processing system, includes a bus 102 which is coupled to a microprocessor(s) 103 and a ROM (Read Only Memory) 107 and volatile RAM 105 and a non-volatile memory 106. The microprocessor 103 may be a G3 or G4 microprocessor from Motorola, Inc. or one or more G5 microprocessors from IBM. The bus 102 interconnects these various components together and also interconnects these components 103, 107, 105, and 106 to a display controller and display device 104 and to peripheral devices such as input/output (I/O) devices which may be mice, keyboards, modems, network interfaces (e.g. dial-up modem or cable modem or Ethernet interface, etc.), printers and other devices which are well known in the art. Typically, the input/output devices 109 are coupled to the system through input/output controllers 108. The volatile RAM (Random Access Memory) 105 is typically implemented as dynamic RAM (DRAM) which requires power continually in order to refresh or maintain the data in the memory. The mass storage 106 is typically a magnetic hard drive or a magnetic optical drive or an optical drive or a DVD RAM or other types of memory systems which maintain data (e.g. large amounts of data) even after power is removed from the system. Typically, the mass storage 106 will also be a random access memory although this is not required. While FIG. 1 shows that the mass storage 106 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 108 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in machine readable medium such as a memory (e.g. ROM 107, RAM 105, mass storage 106 or a remote storage device or a combination of such devices). In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

Figure 2:
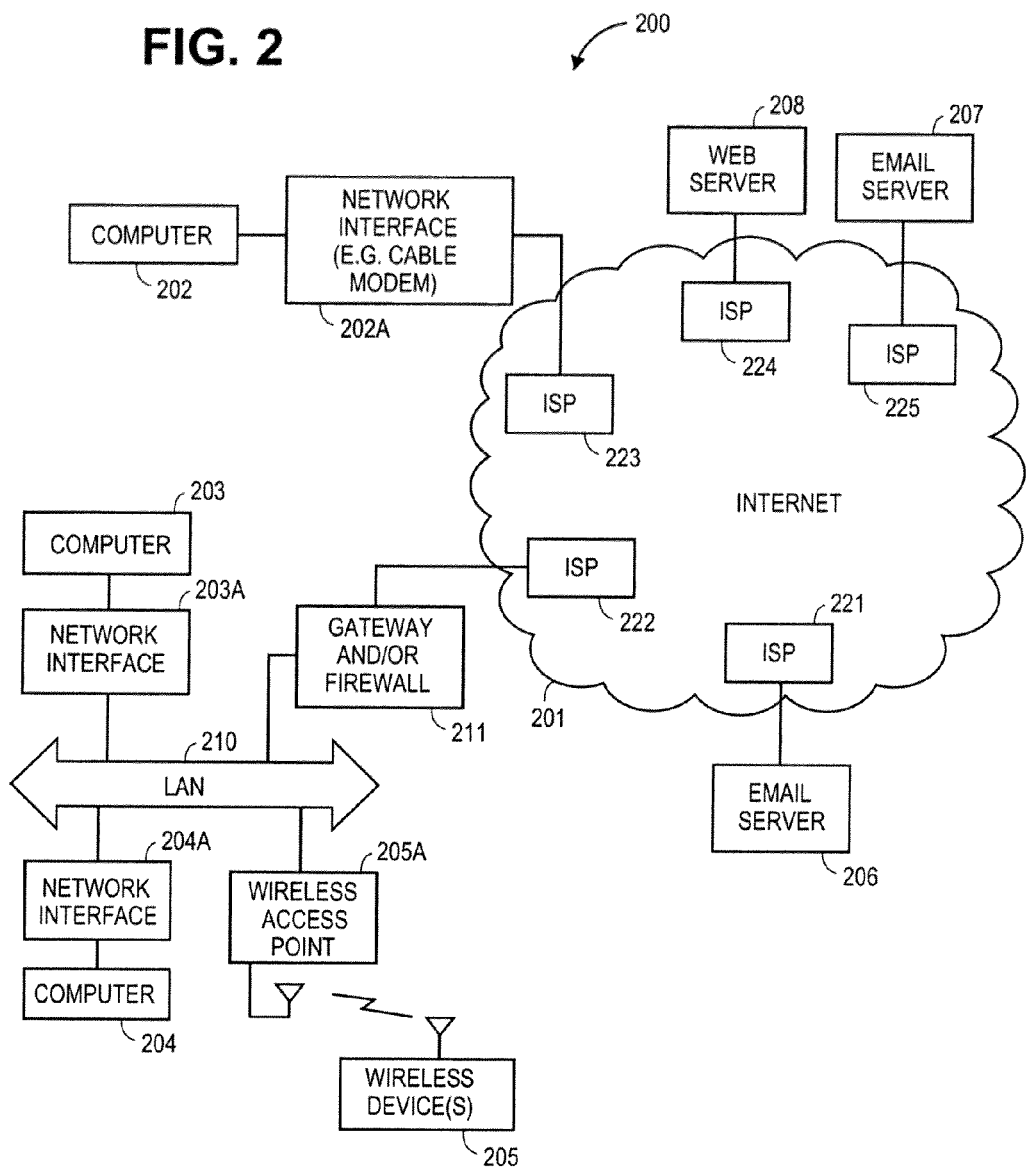
FIG. 2 shows an example of a network and various data processing systems which are coupled to the network.
Figure 3:
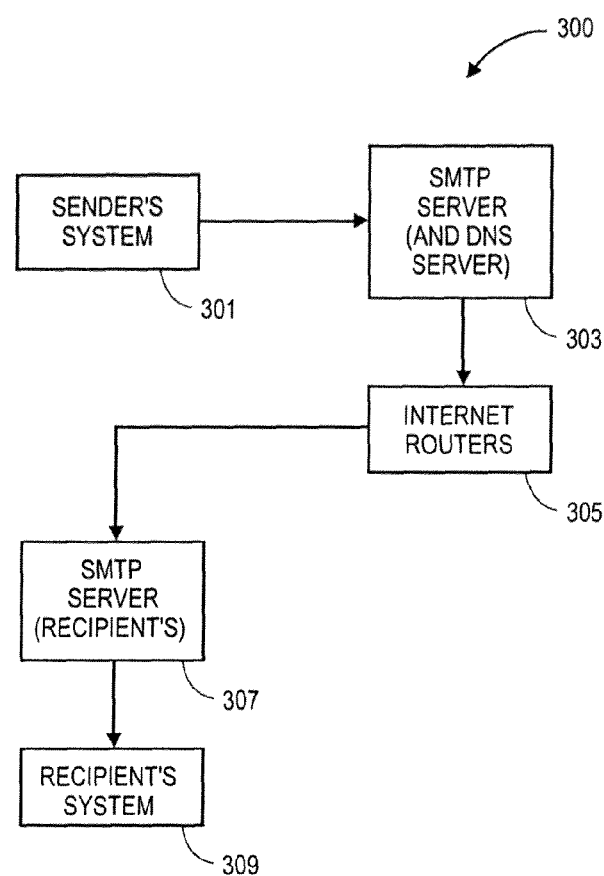
FIG. 3 shows an example of how email may be routed through a plurality of devices, such as servers and routers in a network.

FIGS. 2 and 3 provide background information for showing the context in which emails are transmitted. FIG. 2 illustrates many data processing systems, such as computers, interconnected through a network which includes a local area network (LAN) 210 and the Internet 201. The Internet includes Internet Service Providers (ISP) 221-225 which serve to couple systems, such as a web server or a client system, such as computer 202, to the rest of the Internet. Typically, each computer or data processing device includes a network interface such as a cable modem or a dial-up modem or an Ethernet card or a wireless modem which allows the data processing device, such as the computers 202, 203, and 204 as well as servers 207, 206, and 208, to be coupled to the Internet. Often, a gateway system or a firewall serves as a buffer between a local area network, such as local area network 210 and the rest of the Internet 201. An example of such a gateway or firewall is shown as system 211 in FIG. 2. The network shown in FIG. 2 includes email servers as well as a web server and also includes a wireless device which may be, for example, a wireless laptop computer or a cellular telephone or other wireless devices, and this wireless device 205 is coupled to the network in this case through a wireless access point 205A which in turn is coupled to the LAN 210. It will be appreciated that other types of interconnection and other types of components may be utilized in such a system and still be able to process emails from one system to another system.

FIG. 3 shows a simplified flow of an email from a sender's system 301 through various components in a network 300 shown in FIG. 3. The sender's system 301 transmits an email to an SMTP server which also may include a DNS server 303. This server, in turn, transmits the email through one or more Internet routers 305 to another SMTP server, in this case server 307, which may be considered to be the recipient's SMTP server. Often, these SMTP servers are maintained by the ISP which the recipient uses for gaining access to the Internet. The email is then transmitted from the recipient's SMTP server 307 to the recipient's system 309. Spoofing scam emails seek to duplicate the emailed address of the sender's system and transmit that email through a similar network to the recipient's system in such a manner that it makes it difficult for the recipient to distinguish the spoofed email from a legitimate email from the true sender. For example, a spoofed email may appear to be from "accountmanagement@amazon.com" when in fact it originated from an organization which has created a spoofed email. Certain embodiments of the present invention seek to make the detection of such spoofed emails easier by utilizing certain information maintained at or available at a recipient's system (e.g. by storing the information locally at the recipient's system or on a local server which is behind a firewall) and by allowing the real owner of the domain to protect an email by authenticating it based upon the domain portion (or domain and subdomain portions) of the email address.

Figure 4:
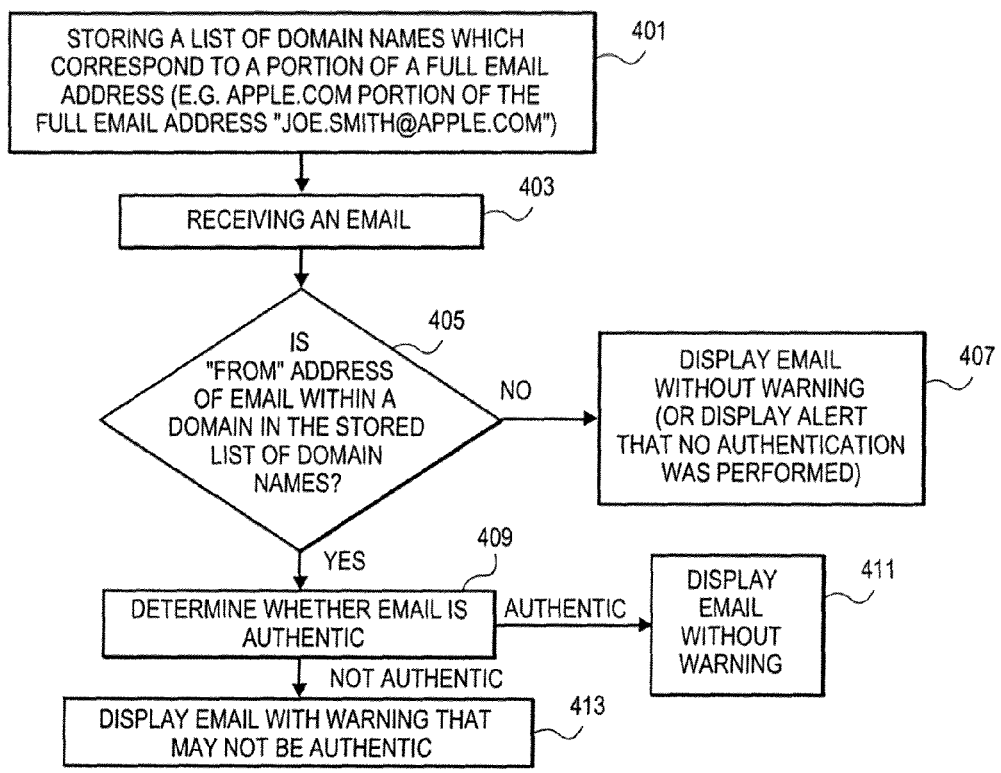
FIG. 4 is a flowchart illustrating one exemplary embodiment of the invention.

FIG. 4 is a flowchart which shows an exemplary method of certain embodiments of the invention. This method may begin in operation 401 in which a list of domain names is stored. This list may be stored in a local storage device of a client computer system, such as the main hard drive or other main non-volatile storage device of the computer system or other data processing system. Typically, this list of domain names would be stored on the same bootable storage medium which is used to boot the computer system or other data processing system. Each of the domain names in the list of domain names corresponds to a portion of a full email address or to a portion of an address for an electronic messaging system, such as a portion of an address used for instant messaging. For example, one such domain name which may be stored in this list is "apple.com" which is a portion of a full email address from that domain, such as the full email address "j.smith@apple.com." Another example of a domain name which may be stored in this list is "amazon.com" which is a portion of the full email address "accountinformation@amazon.com." The storage of this list of domain names is intended to be performed at each data processing system which receives emails that are to be authenticated according to certain embodiments described herein. In operation 403, an email is received at a data processing system which has access to a list of domain names which has been stored. It will be appreciated that this list of domain names (and other data such as public keys for each domain in the list) may be stored at a remote location (remote from the recipient's system which has received the email), such as a remote server which is connected to the client data processing system through a network (e.g. a secured network such as a virtual private network, "VPN" or a remote server which is protected behind the same firewall which protects the recipient's system).

In operation 405 of FIG. 4, it is determined whether the "from" address of the email or other electronic message is within a domain in the stored list of domain names. For example, if the email is from "john.doe@apple.com" or "accountinformation@amazon.com" then, in the examples given above, it will be determined that the sender address ("from" address) of the email is within a domain in the stored list of domain names if both "apple.com" and "amazon.com" are stored in this list. If it is determined in operation 405 that the "from" address of the email is not within a domain in the stored list of domain names, then operation 407, in at least certain embodiments, is performed in which the email is displayed without a warning, such as an alert about the authenticity of the email. Alternatively, an alert or symbol or indicator may be displayed that no authentication was performed on the email. If in operation 405 it is determined that the "from" address of the email is within a domain in the stored list of domain names, then operation 409 follows operation 405 as shown in FIG. 4. In operation 409, it is determined whether the email is authentic. Various specific techniques are described below for performing this determination. Often, these techniques employ cryptographic keys and/or digital certificates and/or hashing functions. If operation 409 determines that the email appears to be authentic, then operation 411 follows in which the email is displayed without a warning with respect to the authenticity of the email because the system has determined that the email appears to be authentic. On the other hand, if operation 409 determines that the email appears to be not authentic, then operation 413 follows in which the email may be displayed with a warning that it may not be authentic. For example, if operation 409 determines that the email may not be authentic, then an alert is displayed or an indicator is displayed which signals to the user that the email may not be from the apparent sender indicated by the "from" address of the email. For example, consider an email which appears to be from "account-information@amazon.com" as indicated by the "from" address or sender address in the email. In this case, if the system determines that the email is not authentic (e.g. because there is no digital certificate embedded with the email or the digital certificate cannot be authenticated), then a warning or other indicia may be displayed to the user upon opening the email or before even opening the email that the email may not be authentic. This warning may, for example, say that "This email may not be from the apparent sender or may not be authentic or may be junk email." Numerous other alternative messages or indicia may be employed to convey a warning to the user that the email may be part of a spoofing scam or other type of scam or scheme. In one alternative scheme, a system may display an "OK" message for an email (indicating that the email has been confirmed to be authentic) and may display no warning for an email that appears to be not authentic; in this case, the user is assumed to realize that the absence of the "OK" message means that the email may not be authentic.

The foregoing method used in certain embodiments of the invention relies upon a portion of the email address which corresponds to the domain portion or portion of the address of other types of electronic messages such as instant messaging. This allows the owner of the domain portion, such as "amazon.com" or "apple.com" to control which emails are transmitted with the proper certificates (e.g. a certificate or a digital signature of the entire email message) or other data used in authenticating the email. Thus an employee at amazon.com sending an email from the employee's email account will include, as part of the full email address, the "amazon.com" domain name which, if that domain name is stored in the list of operation 401, will trigger the processing operations in FIG. 4. If this email is not authenticated by administrators or other control systems of amazon.com (e.g. by embedding a proper digital certificate or other authenticating data, etc. as described herein) then the email will be determined to be from the address of an email within the domain in operation 405 and then be determined in operation 409 to not be authentic, causing the display of a warning in operation 413 even though the email is in fact from an employee at amazon.com (unless this warning is disabled, as may happen in the case of the method shown in FIG. 11). In certain embodiments of the present invention, a user who receives such emails from such employees could instruct the system to stop providing warnings about emails from such employees (e.g. a known employee within a domain) and the system can store a list of full email addresses which are considered authentic (and so no warnings are presented). In certain embodiments, emails from subdomains of a domain may also be examined for authenticity. For example, an email from "joe.smith@accountinfo.amazon.com" may be treated as a subdomain which is authenticated by using a private key/public key combination of the subdomain or by using a private key/public key combination of the domain "amazon.com." In this manner, certain embodiments of the invention may be extended beyond using only the domain portion of an email address. Also, it will be appreciated that a subdomain "accountinfo.amazon.com") may be considered to be within its domain ("amazon.com").

The method of FIG. 4 allows a domain owner to control through an administrator or other control systems which emails are embedded with certificates or other data (e.g. a digital signature of the entire content of or a portion of the email), and then these emails can be sent to users of recipient systems which can automatically perform an authentication operation based upon the domain portion of the email address. Previously storing a list of domain names and potentially other information as described below on recipient systems for various "secured" domains will allow these systems to automatically authenticate emails from domains in the list as long as those domains use the certificates or other data when they desire to send an email which can be considered to be secure using the embodiments of the present invention.

Figure 5:
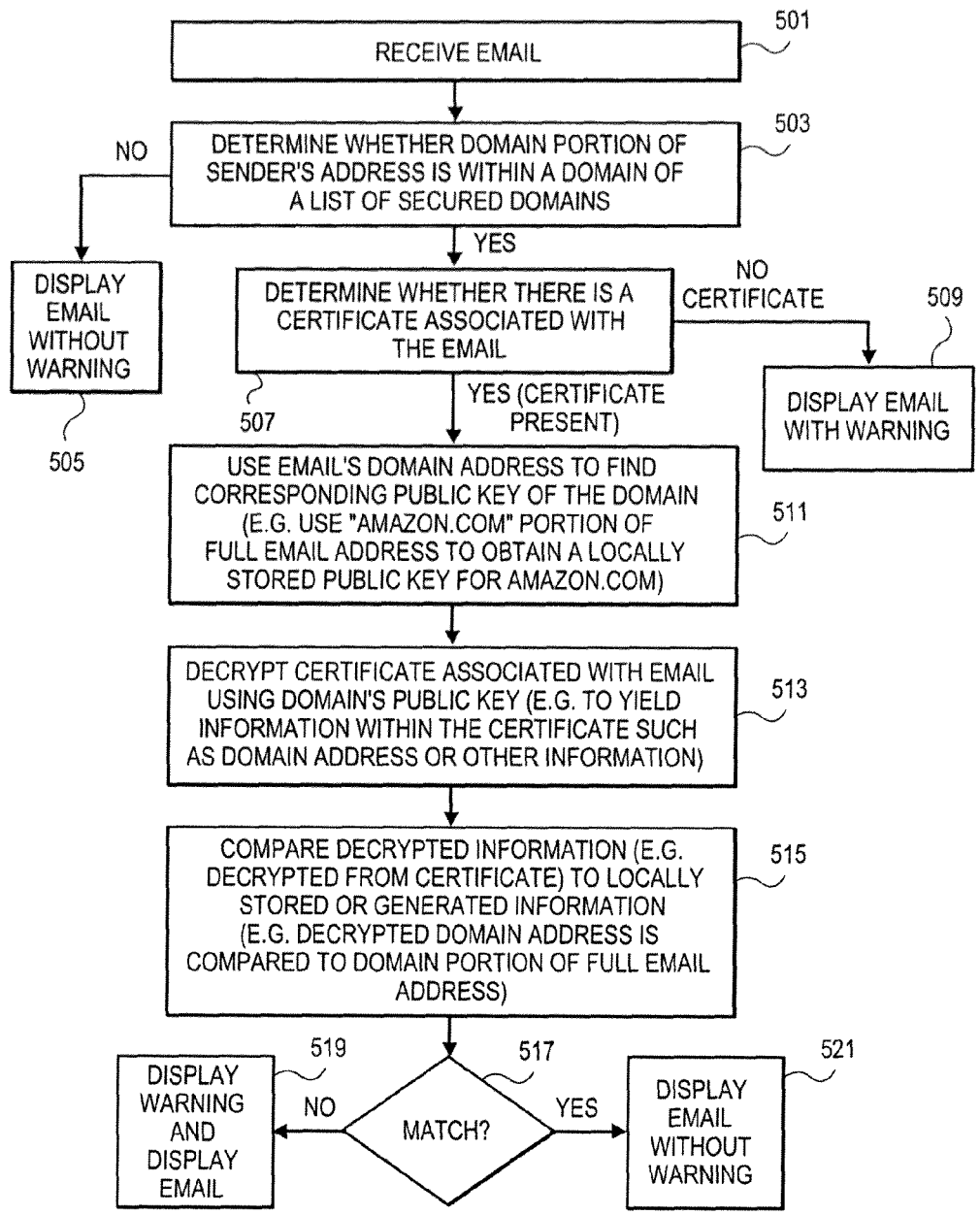
FIG. 5 is another flowchart illustrating another exemplary embodiment of the present invention.
Figure 6:
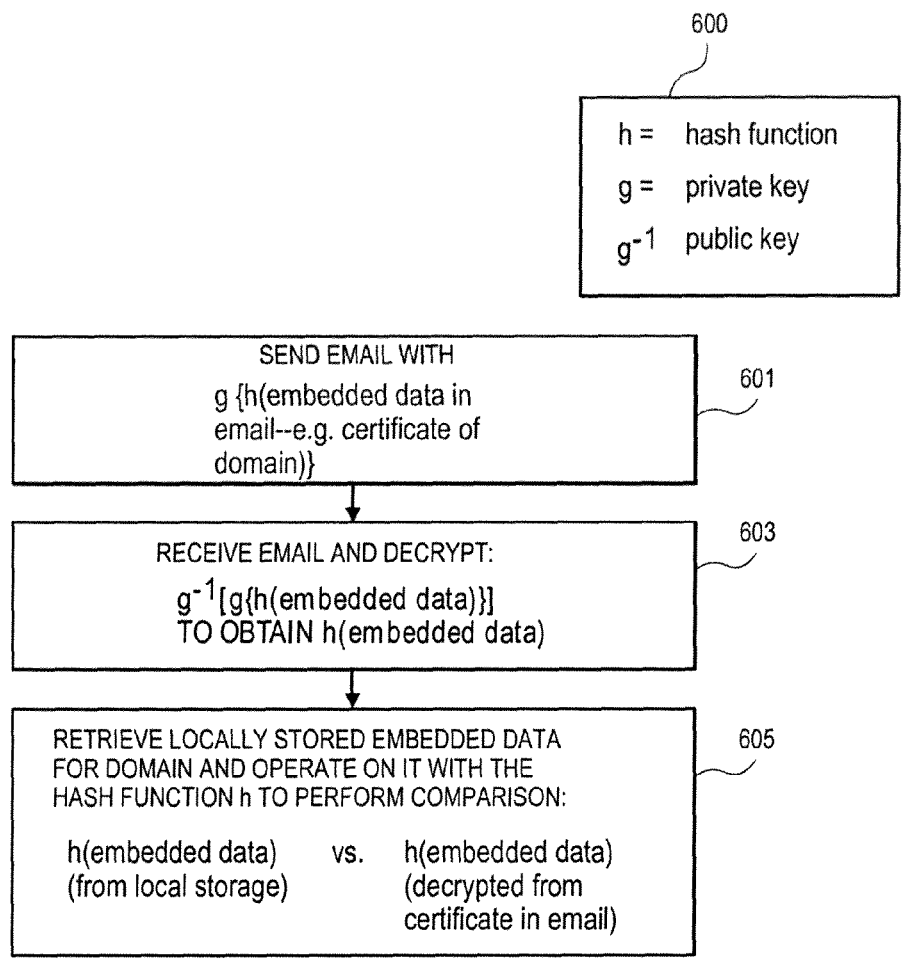
FIG. 6 is a flowchart illustrating an exemplary embodiment which provides specific implementation details of certain embodiments.
Figure 9:
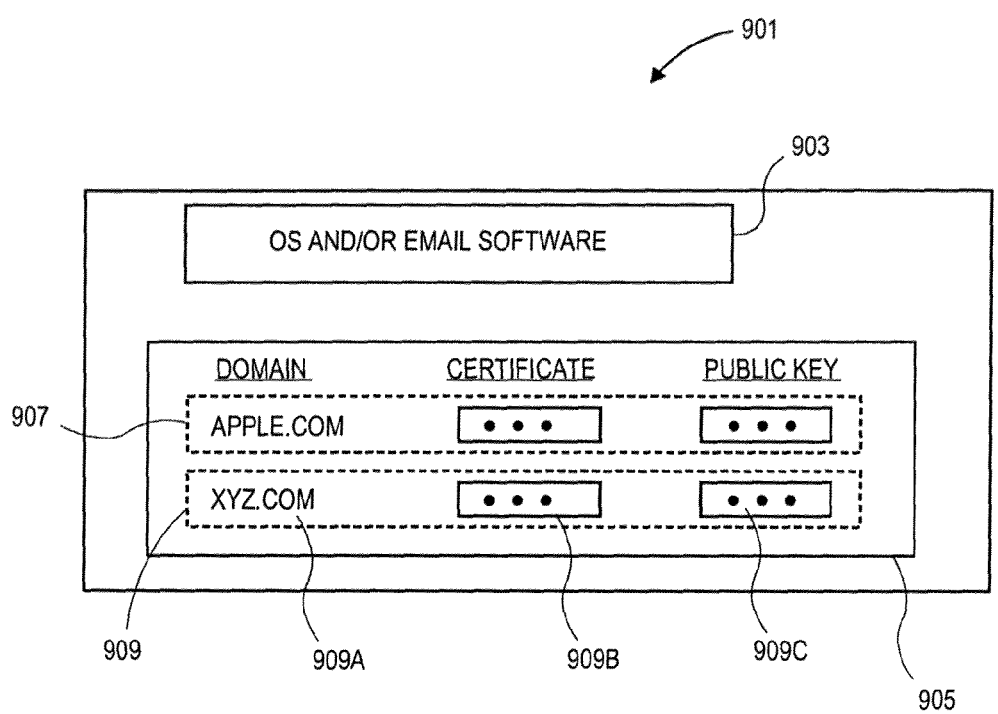
FIG. 9 shows an example of a storage media, such as a CD-ROM or other computer readable medium (e.g. a local storage medium which has received the data and software through a network interface) which may be used to distribute aspects of the present invention.
Figure 11:
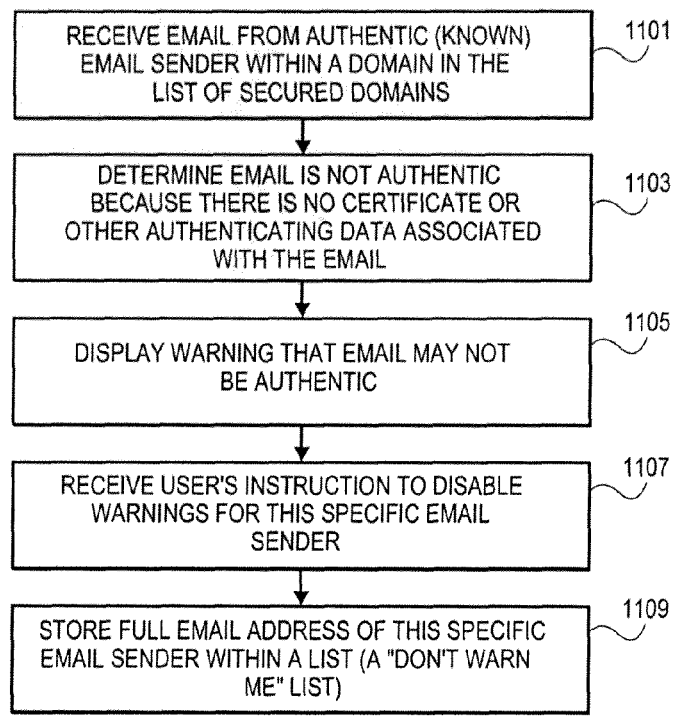
FIG. 11 is a flowchart which shows an exemplary method for disabling warnings based on domain level authentication.

FIG. 5 provides a more specific example of certain embodiments of the present invention. This method may begin in operation 501 in which an email is received at a recipient's data processing system. This data processing system of the recipient is typically the same system which the recipient uses to display emails (e.g. for reading) and to send emails. Operation 503, which follows operation 501, determines whether the domain portion of the sender's address is within a domain of a list of secured domains. If it is not, then operation 505 follows operation 503; in operation 505, the email is displayed without a warning (or alternatively with an indication that no authentication was performed on the email). Operation 505 would be performed for emails from domains which are not within the list of secured domains. For example, if the list of secured domains included only two domains (e.g. apple.com and amazon.com), and an email came from joe@ibm.com, then the system would recognize that no authentication was to be automatically performed on these emails for domains not in the list, thereby resulting in a display of an email without a warning as in operation 505. On the other hand, if operation 503 determines that the domain portion of the sender's address is within a domain of the list of secured domains, then operation 507 follows operation 503, and operation 507 involves the determination of whether there is a certificate or other data associated with the email from an address within a domain in the list of secured domains. If there is no such certificate or other data then operation 509 follows operation 507, and the email may be displayed with a warning that the email may not be authentic (e.g. the email may not be from the apparent sender, etc.). This warning may not be displayed if the user has previously decided that the email is from an authentic source (e.g. a known employee within the domain as in the example given above) and has previously instructed the system to not display a warning. FIG. 11 shows an exemplary method for disabling warnings. If operation 507 determines that a certificate or other data is present, then operation 511 follows operation 507. In the particular implementation shown in FIG. 5, operation 511 uses the email's domain address to find a corresponding public key of the domain. For example, the "amazon.com" portion of a full email address is used to obtain a stored public key for "amazon.com." An example of a storage medium is shown in FIG. 9 which includes information for each secured domain. In the particular implementation of FIG. 9, for each domain there is a certificate and a public key for the corresponding domain and this information on the storage medium may be encrypted. In an alternative implementation, the storage medium is a local storage device (e.g. a boot drive of the recipient's data processing system which has received the email for display by the recipient) which stores, for each domain, only the domain name and the domain's public key (or several public keys for a domain). Thus operation 511 uses the domain address portion of the full email address to look up the corresponding public key for the domain and if necessary, a digital certificate or other data which is used in the authentication process. The domain's public key is used in operation 513 to decrypt the certificate or other data which is associated with the email (e.g. embedded within or with the email). This yields information from the certificate or other data (which may include the domain address or other information) which can be used in a comparison operation to authenticate the email's sender. An example of this comparison operation is shown in operation 515 in which the decrypted information (e.g. decrypted from the certificate which was embedded with the email or decrypted from other information sent with or within the email) is compared to locally stored or locally generated information. In one implementation, a decrypted domain address and other information which was contained within the certificate embedded with the email is compared to the domain portion of the full email address presented by the email "from" field and to other locally stored information. FIG. 6 shows an example of how this may be performed. The comparison performed in operation 515 results in the decision 517 as to whether the information matches or not. If it matches, then it has been determined that the email appears to be authentic and the email may be displayed in operation 521 without a warning (alternatively the email may be displayed with a message that it has been properly authenticated and assumed to be authentic). On the other hand, if there is no match, then in operation 519 the email may be displayed with a warning or an indicia that the email may not be authentic (or only emails which are authenticated are displayed with an indication that they are authentic and the user is assumed to understand that the other emails may not be authentic).

FIG. 6 shows a specific implementation which may be used in certain embodiments of the present invention. This figure shows the mathematical operations which can be performed with data provided by the email and with data provided with the operating system or email software, such as the data shown in FIG. 9. Table 600 shows the functions or operations which are performed on the data in order to determine the authenticity of an email. These operations are performed relative to the domain portion (or domain and at least one subdomain portion) of the email address rather than the full email address according to the embodiments described herein. In operation 601 an email is sent with an encrypted message. This email would normally be sent by the administrator system or other control system which legitimately owns the domain name. For example, an administrator or control system of apple.com would decide which emails need to be authenticated and would embed the encrypted message within the email. In the implementation of the operation 601 shown in FIG. 6, the embedded data may be a certificate of the domain which has been operated on by a hash function (there are many hash functions which are well known in the art), and the result of that hash function has been encrypted with a private key of the domain to yield the result shown in operation 601. Alternatively, the embedded data may be the entire email message or a portion of the entire email message. This email is received with the embedded message which is encrypted and the recipient's system decrypts this encrypted message in operation 603 (which is normally performed at the recipient's data processing system). In this particular operation, the public key of the domain is used to decrypt the message which produces the result of the hash function on the embedded data. It will be appreciated that the hash function may be a known hash function (e.g. the Secure Hash Algorithm (SHA) which produces an SHA 1 message digest) which is known by both the sender and the recipient such that the hash function is common on both the sender's system and the receiver's system. The receiver's system may retrieve the locally stored embedded data for the domain, such as the certificate for the domain shown in FIG. 9, and may operate on that embedded data with the hash function h to obtain a value h(embedded data) which is obtained from the locally stored certificate. This result is then compared in operation 605 to h(embedded data) which is obtained by decrypting the certificate from the email. If a comparison shows that the two values match, then it can be reasonably assumed that the email is authentic. In those implementations in which the embedded data is the entire email message (or a portion thereof), operation 603 decrypts the hashed email message with the domain's public key to obtain "h(email message)," which is then compared in operation 605 with a locally generated version of the hashed email message (obtained by using the received email message and operating on it with the hash function to obtain the locally generated version of the hashed email message). It will be appreciated that operation 603 and 605 may be an implementation of operations 513 and 515 shown in FIG. 5. Further, it will be appreciated that operations 603 and 605 are one specific implementation of operation 409 of FIG. 4. It will also be appreciated that the information for the "secured" domains may be stored remotely from the recipient's data processing system rather than on a local storage. This is particularly true if a secure connection (e.g. through a VPN or where both the remote storage and the recipient's system are protected by one or more firewalls) to the remote storage can be established. An example of the information stored is shown in FIG. 9, and this information may include for each domain the domain name itself, a certificate or other data used in the authentication process, and a public key for the domain. In these implementations in which the entire email message is operated on by a hash function and then encrypted with a domain's private key and then that result is sent with the email message, the certificate for the domain is an optional element.

It will be appreciated that FIG. 6 represents one particular implementation which uses public key/private key cryptology, such as the encryption technology available from RSA Security, Inc. of Bedford, Mass.

Figure 7:
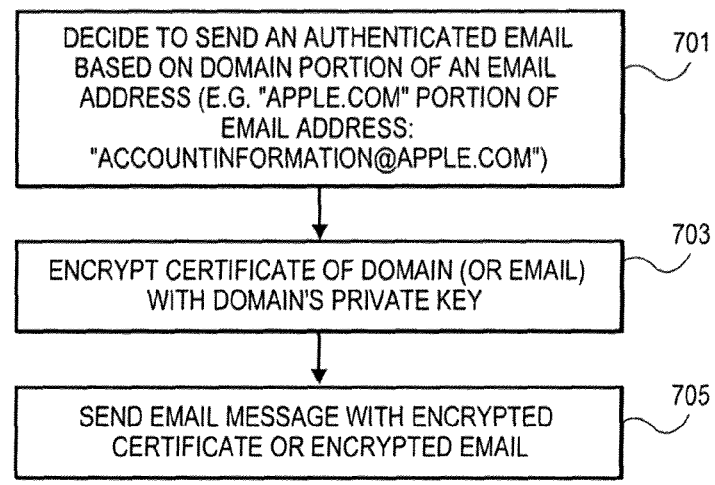
FIG. 7 is a flowchart which illustrates how the owner of a "secure" domain may send email which is desired to be "secured" in the sense that it can be automatically authenticated by a user of a client software, such as the software shown in FIG. 9.

At least certain embodiments of the present invention require administrator or control systems within the domain to decide which emails will be "secured" through the addition of a certificate or other data (e.g. an encrypted version of the entire email message) which is used in conjunction with the data obtained by the recipient's system such as the data shown in FIG. 9. Thus users, such as an employee within a secured domain (e.g. joe@amazon.com) cannot "secure" their email in these embodiments. FIG. 7 represents an example of how a domain which is included within the list of stored domains (e.g. list 905 in FIG. 9) processes emails from certain accounts within that domain so that they may be received in a "secured" manner and be automatically authenticated using, for example, the methods of FIG. 4 or FIG. 5 or FIG. 6. In operation 701 an administrator system or other control system within a legitimate domain decides that a particular email is to be sent in a manner which can be automatically authenticated based on the domain portion of the email address. For example, based on the "apple.com" portion of the email address "accountinformation@apple.com", the administrator system operating under the control of the legitimate owner of the domain decides that a particular email is to be authenticated. Each domain may independently establish policies and rules (which can be confidential and not publicly known) about which emails are to be automatically authenticated based upon the domain portion. This is performed in operation 703 in which a certificate (or other data such as the entire email message or a portion thereof) of the domain is encrypted with the domain's private key. This certificate or other data may, prior to encryption with the private key, be operated on by a hash function to yield the data which is then encrypted with the private key as in operation 601 of FIG. 6. Then the email is sent in operation 705 with the encrypted certificate or other data embedded within the email or otherwise associated with the email. It will be appreciated as described above that other email accounts, such as employees within that same domain, cannot send an encrypted certificate (or other data) which will match the previously stored certificate in the list of domain names, such as list 905, (or which will cause a match between locally generated data and decrypted data) unless the entity which controls the domain name decides to provide that ability to a particular employee.

Figure 8:
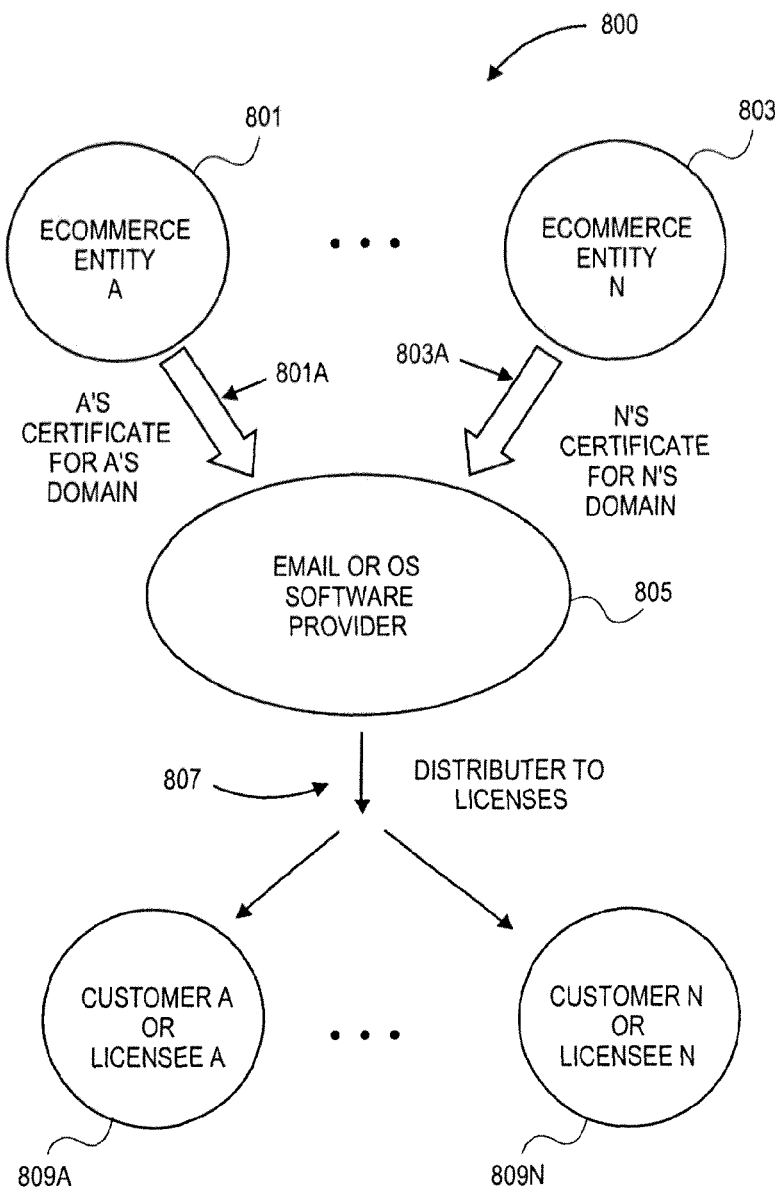
FIG. 8 shows an example of a method for making embodiments of the present invention available to users in a user-friendly manner.

FIG. 8 represents an exemplary method 800 for producing copies of software which include capabilities to support email, and particularly email which can be "secured" through some of the automatic authentication methods described herein (e.g. those methods shown in FIGS. 4 and 5). The provider 805 of email or operating system software or other types of software, such as instant messaging software or other electronic messaging software, may collect from a variety of entities, such as ecommerce entities 801-803, a plurality of domain names as well as optional certificates (or other data used in an authentication process) for those domain names. In the example 800 shown in FIG. 8, the ecommerce entity A provides a certificate and/or other data such as a domain name and a public key for the domain name which corresponds to A's domain, while the ecommerce entity N provides N's certificate and/or other data such as a domain name and a public key for the domain name for N's domain to the provider 805. Arrow 801A shows that A is providing A's certificate (and/or other data) to the provider 805 of email or operating system software, and arrow 803A shows that N is providing N's certificate (and/or other data) to the provider 805. The communication between the ecommerce entities and the provider 805 may be secured in some manner (e.g. it may be an encrypted and authenticated electronic communication). This provider 805 then stores the collection of domain names with the corresponding data (e.g. public keys) for each of those domains along with email software and/or operating system software. An example of this storage is shown in FIG. 9 in which the storage medium 901 includes the operating system (OS) software and/or email software 903 or other types of software, such as instant messaging software or other electronic messaging software, as well as the list 905 which includes, for each domain, the domain name itself, a certificate or other data which is used in the authentication process, and a public key for each domain. The software may be a complete package (e.g. a complete email software program) or a "plug-in" for a software program. While the public key may be referred to as a "public" key, it may in fact be kept secret by the domain which generated the public key and by the provider 805 and stored in encrypted form in the storage medium 901 and the certificate may also be stored in encrypted form. The provider 805 may use its cryptography keys to encrypt both the domain's public key and its corresponding certificate or other data. This data may be stored on CD-ROMS or DVD-ROMS or other storage media which may be distributed to customers through a distributor 807 or electronically through the Internet to licensees 809A-809N. In this manner, each user or recipient, such as licensees A through licensee N, will automatically receive and be able to install the software 903 with the list 905 on a user's local storage device (e.g. the user's boot hard drive) which can then be used automatically (in effect, in the "background") each time a user receives an email address having the domain portion which matches the domain portion stored in the list 905. In this manner, such email can be automatically authenticated as described herein (e.g. the methods of FIG. 4 or the methods of FIG. 5) without the user having to enable authentication or install or retrieve cryptographic keys, etc. or install other software. FIG. 9 shows an example of the type of data which may be included in a list, such as list 905. This data may include a domain name, such as domain name 909A, a corresponding certificate or other data used for authentication such as certificate 909B, and a public key such as public key 909C.

The provider 805 may advertise to the public the automatic authentication feature for domains in the list of secured domains so that licensees understand the advantage provided by the distributed software. Further, the provider 805 may provide to such licensees a list of secured domains so that such licensees can interpret or disable warnings displayed by the software when an authentic employee within one of the domains in the list of secured domains sends an email which is not sent with authentication data by the domain's sending email servers. FIG. 11 shows an example of how a licensee can disable warnings. In operation 1101, a licensee receives an email from an authentic email sender within a domain in the list of secured domains. The licensee's system determines, in operation 1103, that the email appears to be non-authentic because there is no certificate or other authentication data associated with the email. This operation 1103 is similar to operation 507 in FIG. 5. Operation 1105 displays a warning which the licensee recognizes is incorrect (e.g. the licensee knows the employee and the employee's email address within the secured domain (e.g. the employee is the licensee's spouse) and the licensee knows the employee sent the email). The licensee then disables the warning in operation 1107, and the system disables the warning for this particular email address and stores, in a list of "known," authentic email addresses, the full email address of this specific email sender. In this manner, the licensee's system can be trained to not display warnings for known authentic email addresses even when they originate within secured domains.

The provider 805 may periodically provide updated software (e.g., updated OS or email software or instant messaging software or other types of electronic messaging software or plug-ins for existing software) and with this updated software, the provider 805 may include information (such as domain names and corresponding public keys and optional certificates) for new domains not in previously distributed lists, such as list 905 and may also include updated information for "old" domains already having information in previously distributed lists. Such updated information may include new public keys and/or new domain names (e.g. where the old public keys previously distributed have expired or are about to expire). The provider 805 may store the public keys of the domains within certificates which have been encrypted or signed by the provider 805. In effect, the provider 805 may operate as a trusted certificate authority and encrypt (using provider 805's private key) information from a domain in the secured list of domains (for example, the information may include the domain's public key or keys and the domain's name and other identifying information, such as information found within an x.509 certificate). The stored information for a domain in the secured list of domains may take the form of "gca (domain name; domain's public key; other information)", where gca is a private key of the provider 805, and the corresponding public key "$g^{-1}ca$" (which may be kept secret) of the provider 805 may be used through a decryption operation to retrieve the domain's public key from the stored information.

In the embodiments described herein, the authentication data (e.g. the data in FIG. 9) is locally stored (e.g. on the email recipient's hard drive which also includes the recipient's OS), and thus it can be controlled locally. This is in contrast to a system where an email server (e.g. the recipient's email server at the recipient's ISP) uses a domain's public key to authenticate an email from a sender within the domain and obtains the domain's public key from a DNS (Domain Name System) server. In such a system, only the owner of a DNS record can change the record and thus there is no capability to locally manage digital cryptographic data at the recipient's local storage. Furthermore, using the DNS to store a domain's public key requires a direct mapping to DNS servers; only domains that can be directly looked up in DNS can support this if supported by a DNS server. Also, DNS is not secure and does not use a secure protocol, and hence DNS can be attacked. In contrast, local storage of the digital cryptographic data (e.g. as in FIG. 9) allows the data to be protected with local cryptography as described herein to secure it from attack.

Figure 10:
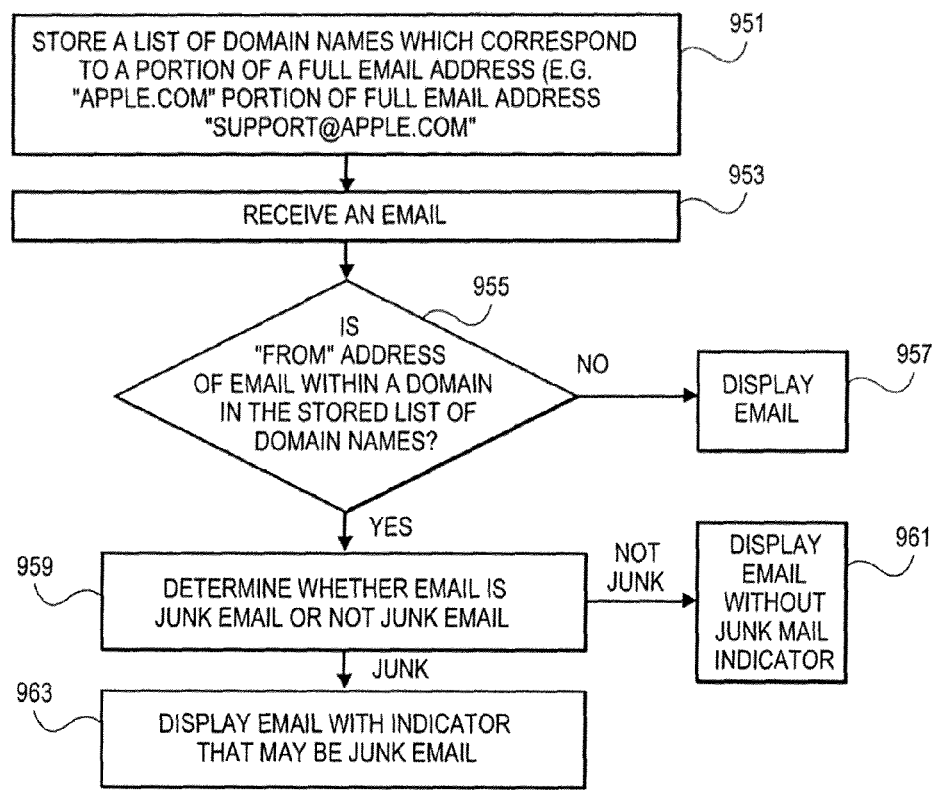
FIG. 10 is a flowchart which depicts a method in which an aspect of the invention may be used to determine whether email is junk mail or not junk mail.

While certain embodiments have been described for the purpose of authenticating email, other embodiments may be used to determine whether or not email is junk mail. An example of this embodiment is shown in FIG. 10 which may begin in operation 951. In this operation, a list of domain names which correspond to a portion of a full email address is stored. Then in operation 953, an email is received and this email is then examined in operation 955 to determine whether the "from" address of the email is within a domain in the stored list of domain names. If it is not, then operation 957 displays the email. Otherwise, if it is within the list, then operation 959 follows in which it is determined whether the email is junk email or not junk email. If it is not junk email, the email may be displayed in operation 961 without a junk email indicator. If it is junk email, then the email may be displayed with an indicator that it is junk email in operation 963. This method may be performed by utilizing certificates within the email which are compared against certificates obtained by the recipient system. For example, a method such as that shown in FIG. 6 may be employed to filter junk email on the basis of the domain portion of the full email address.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine readable non-transitory storage medium providing executable computer program instructions which when executed by a data processing device cause the data processing device to perform a method for processing an electronic message, the method comprising:

storing, at the data processing device as a client for a recipient address associated with a user using a display device of the data processing device to send and display emails having the recipient address, authentication data including a plurality of domain names, each of which corresponding to a portion of a full email address, wherein the authentication data is locally accessible within the data processing device insulated from domain name system security attacks;

receiving, at the data processing device, a first email addressed to the recipient address;

determining, at the data processing device, whether to perform a verification operation cryptographically based on public/private key cryptology on the first email to determine if the first email is authentic using the authentication data, wherein the verification operation on the first email is not performed if a sender address specified by the first email is outside of domains specified by the plurality of domain names stored at the data processing device;

presenting, on the display device of the data processing device, the first email if the verification operation is determined not to be performed on the first email;

performing the verification operation to determine if the first email is authentic if the sender address is within a domain specified by the plurality of domain names, the verification operation to determine whether the first email includes cryptographic data for the domain at the data processing device, the verification operation to determine, if the first email includes the cryptographic data, whether the first email at the data processing device is authentically from an entity which controls the domain specified by the plurality of domain names;

determining, at the data processing device, whether to enable an indication of nonauthenticity for the first email, wherein the indication of nonauthenticity is disabled if the sender address is within a list of known addresses and wherein each of the list of known addresses is within the domains specified by the plurality of domain names;

presenting, on the display device of the data processing device, the indication of nonauthenticity with the first email if the indication is enabled; and in response to receiving a user instruction subsequent to the presentation of the indication, updating, at the data processing device, the list of known addresses with the sender address of the first email, wherein the indication of nonauthenticity is disabled for a second email from the sender address addressed to the recipient address.

2. A medium as in claim 1 wherein the storing is performed locally at a system which displays a content of the first email, wherein performing the verification operation to determine whether the first email is authentically from the entity comprises presenting, if the sender address is within the domain and if the first email does not include the cryptographic data which is used to verify the authenticity, the indication of nonauthenticity and wherein the cryptographic data includes a domain name of the domain.

3. A medium as in claim 2 wherein performing the verification operation to determine whether the first email is authentically from the entity further comprises:

obtaining a cryptographic key for the domain and mathematically operating on the cryptographic data, which is used to verify the authenticity, with the cryptographic key to obtain a first result;

comparing the first result to another result; and wherein the presenting of the indication of nonauthenticity occurs if the first result does not match the another result.

4. A medium as in claim 3 wherein the cryptographic data is a digital certificate and wherein the storing of the plurality of domain names further comprises:

storing for each of the domain names a corresponding domain certificate which represents the another result and a corresponding cryptographic key.

5. A medium as in claim 3 wherein the cryptographic key is a public key of the domain which has a corresponding private key of the domain.

6. A medium as in claim 5 wherein the cryptographic data, if the first email is authentically from the entity, has been mathematically operated on by the private key of the domain.

7. A medium as in claim 4, wherein the corresponding domain certificates are obtained from a trusted certificate authority.

8. A medium as in claim 3 wherein the indication of nonauthenticity indicates that the first email may not be from the entity, and wherein the plurality of domain names are stored on the medium.

9. A method for processing an electronic message, the method comprising:

storing, at a data processing device as a client for a recipient address associated with a user using a display device of the data processing device to send and display emails having the recipient address, authenticating data including a plurality of domain names, each of which corresponding to a portion of a full email address, wherein the authentication data is locally accessible within the data processing device insulated from domain name system security attacks;

receiving, at the data processing device as a client system, a first email addressed to the recipient address;

determining, at the data processing device, whether to perform verification operation cryptographically based on public/private key cryptology on the first email to determine if the first email is authentic using the authentication data, wherein the verification operation on the first email is not performed if a sender address specified by the first email is outside of domains specified by the plurality of domain names stored at the data processing device;

presenting the first email, on the display device of the data processing device, if the verification if the verification operation is determined not to be performed on the first email;

performing the verification operation to determine if the first email is authentic if the sender address is within a domain specified by the plurality of domain names, the verification operation to determine whether the first email includes cryptographic data for the domain at the data processing device, the verification operation to determine if the first email includes the cryptographic data, whether the first email at the data processing device is authentically from an entity which controls the domain specified by the plurality of domain names;

determining, at the data processing device, whether to enable an indication of nonauthenticity for the first email, wherein the indication of nonauthenticity is disabled if the sender address is within a list of known addresses and wherein each of the list of known addresses is within the domains specified by the plurality of domain names;

presenting, on the display device of the data processing device, the indication of nonauthenticity with the first email if the indication is enabled; and in response to receiving a user instruction subsequent to the presentation of the indication, updating, at the data processing device, the list of known addresses with the sender address of the first email, wherein the indication of nonauthenticity is disabled for a second email from the sender address addressed to the recipient address.

10. A method as in claim 9 wherein the storing is performed locally at a system which displays a content of the first email and wherein performing the verification operation to determine whether the first email is authentically from the entity comprises:

presenting, if the sender address is within the domain and if the first email does not include the cryptographic data which is used to verify the authenticity, the indication of nonauthenticity and wherein the cryptographic data includes a domain name of the domain.

11. A method as in claim 10 wherein performing the verification operation to determine whether the first email is authentically from the entity further comprises:

obtaining a cryptographic key for the domain and mathematically operating on the cryptographic data, which is used to verify the authenticity, with the cryptographic key to obtain a first result;

comparing the first result to another result;

and wherein the presenting of the indication of nonauthenticity occurs if the first result does not match the another result.

12. A method as in claim 11 wherein the cryptographic data is a digital certificate and wherein the storing of the plurality of domain names further comprises:

storing for each of the domain names a corresponding domain certificate which represents the another result and a corresponding cryptographic key.

13. A method as in claim 11 wherein the cryptographic key is a public key of the domain which has a corresponding private key of the domain.

14. A method as in claim 13 wherein the cryptographic data, if the first email is authentically from the entity, has been mathematically operated on by the private key of the domain.

15. A method as in claim 12, wherein the corresponding domain certificates are obtained from a trusted certificate authority.

16. A method as in claim 11 wherein the indication of nonauthenticity indicates that the first email may not be from the entity.

17. A data processing device having at least one processor configured via a memory storing instructions, the processor executing the instructions to perform a method, the method comprising:

storing, at the data processing device as a client for a recipient address associated with a user using a display device of the data processing device to send and display emails having the recipient address, authentication data including a plurality of domain names, each of which corresponding to a portion of a full email address, wherein the authentication data is locally accessible within the data processing device insulated from domain name system security attacks;

receiving, at the data processing device, a first email addressed to the recipient address;

determining, at the data processing device, whether to perform a verification operation cryptographically based on public/private key cryptology on the first email to determine if the first email is authentic using the authentication data, wherein the verification operation on the first email are not performed if a sender address specified by the first email is outside of domains specified by the plurality of domain names stored at the data processing device;

presenting, on the display device of the data processing device, the first email if the verification operation is determined not to be performed on the first email;

performing the verification operation to determine if the first email is authentic if the sender address is within a domain specified by the plurality of domain names, the verification operation to determine whether the first email includes cryptographic data for the domain at the data processing device, the verification operation to determine if the first email includes the cryptographic data, whether the first email at the data processing device is authentically from an entity which controls the domain specified by the plurality of domain names;

determining, at the data processing device, whether to enable an indication of nonauthenticity for the first email, wherein the indication of nonauthenticity is disabled if the sender address is within a list of known addresses and wherein each of the list of known addresses is within the domains specified by the plurality of domain names;

presenting, on the display device of the data processing device, the indication of nonauthenticity with the first email if the indication is enabled; and in response to receiving a user instruction subsequent to the presentation of the indication, updating, at the data processing device, the list of known addresses with the sender address of the first email, wherein the indication of nonauthenticity is disabled for a second email from the sender address addressed to the recipient address.

18. A data processing device as in claim 17 wherein the storing is located at the data processing device which displays the first email and wherein the performing the verification operation to determine whether the first email is authentically from the entity comprises:

presenting, if the sender address is within the domain and if the first email does not include the cryptographic data which is used to verify the authenticity, the indication of nonauthenticity and wherein the cryptographic data includes a domain name of the domain.

19. A data processing device as in claim 18 wherein the performing the verification operation to determine whether the first email is authentically from the entity further comprises:

obtaining a cryptographic key for the domain and mathematically operating on the cryptographic data, which is used to verify the authenticity, with the cryptographic key to obtain a first result;

comparing the first result to another result;

and wherein the presenting of the indication of nonauthenticity occurs if the first result does not match the another result.

20. A data processing device as in claim 19 wherein the cryptographic data is a digital certificate and wherein the storing of the plurality of domain names further comprises:

storing for each of the domain names a corresponding domain certificate which represents the another result and a corresponding cryptographic key.

21. A data processing device as in claim 19 wherein the cryptographic key is a public key of the domain which has a corresponding private key of the domain.

22. A data processing device as in claim 21 wherein the cryptographic data, if the first email is authentically from the entity, has been mathematically operated on by the private key of the domain.

23. A data processing device as in claim 20, wherein the corresponding domain certificates are obtained from a trusted certificate authority.

24. A data processing device as in claim 19 wherein the indication of nonauthenticity indicates that the first email may not be from the entity.

25. A data processing device as a client for a recipient address, the data processing device being capable of processing email, the data processing device comprising:
    a non-volatile storage as a local storage of the data processing device to store authentication data including a plurality of domain names, each of which corresponding to a portion of a full email address, wherein the authentication data is locally accessible within the data processing device insulated from domain system security attacks;
    a network interface to receive and send the emails including at least a first email addressed to the recipient address;
    a display device capable of displaying the emails; and
    at least one processor coupled to the non-volatile storage, the display device and the network interface, the processor being configured to
        determine whether to perform verification operation cryptographically based on public/private key cryptology on the first email to determine if the first email is authentic using the authentication data, wherein the verification operation on the first email are not formed if a sender address specified by the is outside of domains specified by the plurality of domain names,
        present the first email on the display device if the verification operation are determined not to be performed on the first email,
        perform the verification operation to determine if the first email is authentic if the sender address is within a domain specified by the plurality of domain names, the verification operation to determine whether the first email includes cryptographic data for the domain, the verification operation to determine, in response to determining that the first email includes the cryptographic data, whether the first email is authentically from an entity which controls the domain specified by the plurality of domain names,
        determine whether to enable the indication of nonauthenticity for the first email, wherein the indication of nonauthenticity is disabled if the sender address is within a list known addresses and wherein each of the list of known addresses is within the domains specified by the plurality of domain names,
        present the indication of nonauthenticity with the first email on the display device if the indication is enabled, and
        in response to receiving a user instruction subsequent to the presentation of the indication, update the list of known addresses with the sender address of the first email, wherein the indication of nonauthenticity is disabled for a second email from the sender address addressed to the recipient address, wherein the recipient address is associated with a user using the display device to display emails having the recipient address.

26. A data processing device as in claim 25 wherein the non-volatile storage is a local storage located at the data processing device and wherein the processor presents, if the first email does not include the cryptographic data which is used to verify the authenticity, the indication of nonauthenticity and wherein the cryptographic data includes a domain name of the domain.

27. A data processing device as in claim 26 wherein the processor obtains a cryptographic key for the domain and mathematically operates on the cryptographic data, which is used to verify the authenticity, with the cryptographic key to obtain a first result;
    and wherein the processor compares the first result to another result;
    and wherein the presenting of the indication of nonauthenticity occurs if the first result does not match the another result.

28. A data processing device as in claim 27 wherein the cryptographic data is a digital certificate and wherein the non-volatile storage also stores for each of the domain names a corresponding domain certificate which represents the another result and a corresponding cryptographic key.

29. A data processing device as in claim 27, wherein the cryptographic key is a public key of the domain which has a corresponding private key of the domain.

30. A data processing device as in claim 29 wherein the cryptographic data, if the first email is authentically from the entity, has been mathematically operated on by the private key of the domain.

31. A data processing device as in claim 28 wherein the corresponding domain certificates are obtained from a trusted certificate authority.

32. A method for processing email on a data processing device as a client for a recipient address, the method comprising:
    storing, on the data processing device, a plurality of digital certificates for a plurality of corresponding domains, the plurality of digital certificates including a first digital certificate associated with a domain portion of an email address for a first domain, the recipient address associated with a user using a display device of the data processing device to send and display emails having the recipient address, wherein the digital certificates are locally accessible within the data processing device insulated from domain name system security attacks;
    receiving, at the data processing device, a first email addressed to the recipient address from a specified address which includes the domain portion;
    determining, at the data processing device, whether to perform a verification operation cryptographically based on public/private key cryptology on the first email to determine if the first email is authentic using the digital certificates, wherein the verification operation on the first email are not performed if a sender address specified by the first email is outside of the plurality of corresponding domains for the plurality of digital certificates;
    presenting, on the display device of the data processing device, the first email if the verification operation is determined not to be performed on the first email;
    performing the verification operation to determine if the first email is authentic if the sender address is within the plurality of corresponding domains for the plurality of digital certificates, the verification operation to determine whether the first email has a received digital certificate for the first domain, the verification operation to determine if the first email does have the received digital certificate for the first domain, whether the received digital certificate matches the first digital certificate at the data processing device;

determining, at the data processing device, whether to enable an indication of nonauthenticity for the first email, wherein the indication of nonauthenticity is disabled if the sender address is within a list of known addresses, wherein each of the list of known addresses is within the plurality of corresponding domains for the plurality of digital certificates, wherein the indication of nonauthenticity is enabled if the sender address is within the plurality of corresponding domains for the plurality of digital certificates and that the verification of the authenticity of the first email fails;

presenting, on the display device of the data processing device, the indication of nonauthenticity with the first email if the indication is enabled; and in response to receiving a user instruction subsequent to the presentation of the indication, updating, at the data processing device, the list of known addresses with the sender address wherein the indication of nonauthenticity is disabled for a second email from the sender address addressed to the recipient address.

33. A machine readable non-transitory storage medium providing executable computer program instructions which when executed by a data processing device as a client for a recipient address cause the data processing device to perform a method for processing email on a data processing device, the method comprising:

storing, on the data processing device, a plurality of digital certificates for a plurality of corresponding domains, the plurality of digital certificates including a first digital certificate associated with a domain portion of an email address for a first domain, the recipient address associated with a user using a display device of the data processing device to send and display emails having the recipient address, wherein the digital certificates are locally accessible within the data processing device insulated from domain name system security attacks;

receiving, at the data processing device, a first email addressed to the recipient address from a specified address which includes the domain portion;

determining, at the data processing device, whether to perform a verification operation cryptographically based on public/private key cryptology on the first email to determine if the first email is authentic using the digital certificates, wherein the verification operation on the first email are not performed if a sender address, specified by the first email is outside the plurality of corresponding domains for the plurality of digital certificates;

presenting, on the display device of the data processing device, the first email if the verification operation is determined not to be performed on the first email;

performing the verification operation to determine if the first email is authentic if the sender address is within the plurality of corresponding domains for the plurality of digital certificates, the verification operation to determine whether the first email has a received digital certificate for the first domain, the verification operation to determine if the first email does have the received digital certificate for the first domain, whether the received digital certificate matches the first digital certificate at the data processing device;

determining, at the data processing device, whether to enable an indication of nonauthenticity for the first email, wherein the indication of nonauthenticity is disabled if the sender address is within a list of known addresses, wherein each of the list of known addresses is within the plurality of corresponding domains for the plurality of digital certificates, wherein the indication of nonauthenticity is enabled if the sender address is within the plurality of corresponding domains for the plurality of digital certificates and that the verification of the authenticity of the first email fails;

presenting, on the display device of the data processing device, the indication of nonauthenticity with the first email if the indication is enabled; and in response to receiving a user instruction subsequent to the presentation of the indication, updating, at the data processing device, the list of known addresses with the sender address wherein the indication of nonauthenticity is disabled for a second email from the sender address addressed to the recipient address.

34. A method for producing copies of software which includes capabilities to support email, the method comprising:

storing a plurality of digital cryptographic data, each associated with a corresponding domain portion of an email address, at least some of the digital certificates being obtained from e-commerce businesses;

distributing copies of software for storage on a storage media coupled to a device as a client for a recipient address associated with a user using the device to send and display emails having the recipient address, the software including a copy of the plurality of digital cryptographic data and executable computer program instructions for using the plurality of digital cryptographic data, wherein the copy of the plurality of digital cryptographic data is accessible within the device insulated from domain name system security attack, wherein the software includes computer program instructions for software implemented method, and the software implemented method further comprising receiving a first email addressed to the recipient address, determining whether to perform a verification operation cryptographically based on public/private key cryptology on the first email to determine if the first email is authentic using the plurality of digital cryptographic data, wherein the verification is not performed if a sender address specified by the first email is outside of domains associated with the plurality of digital cryptographic data, presenting the first email on the device if the verification operation is determined not to be performed on the first email, performing the verification operation to determine if the first email is authentic if the sender address is
within the domains associated with the plurality of digital cryptographic data, the verification operation to determine whether the first email includes cryptographic data for the domain, determining whether to enable the indication of nonauthenticity for the first email, wherein the indication of nonauthenticity is disabled if the sender address is within a list of know addresses and wherein each of the list of know addresses is within the domains specified by the plurality of digital cryptographic data, presenting the indication of nonauthenticity with the first email if the indication is enabled and the first email is determined to be is not authentic via the verification operation, and in response to receiving a user instruction subsequent to the presentation of the indication, updating the list of known addresses with the sender address of the first email, wherein the indication of nonauthenticity is disabled for a second email from the sender address addressed to the recipient address.

35. A method as in claim 34 wherein the software includes operating system software and wherein the software and the copy are stored on a local storage device of an email recipient's data processing device and wherein the method further comprises distributing copies of updated software and updated cryptographic data to replace expiring cryptographic data.

36. A method as in claim 34 wherein the software includes email software.

37. A method as in claim 34 wherein the verification operation is performed to determine, if the first email includes the cryptographic data, whether the first email is authentically from an entity which controls the domain specified by the plurality of domain names.

38. A method as in claim 34 wherein the distributing of the copies occurs at least in part through a network medium and wherein the method further comprises distributing copies of updated software and updated cryptographic data to replace expiring cryptographic data.

39. A method as in claim 34 wherein the distributing of the copies occurs at least in part through a recording of the software onto optical media and physically distributing the optical media and wherein the method further comprises distributing copies of updated software and updated cryptographic data to replace expiring cryptographic data.

40. A method as in claim 37 wherein the verification operation is performed to determine, if the sender address is within the domain, whether the first email includes the cryptographic data which is used to verify the authenticity of the first email, and wherein the method also comprises:

presenting, if the sender address is within the domain and if the first email does not include the cryptographic data which is used to verify the authenticity, an indication of potential nonauthenticity.

41. A method as in claim 40 wherein the verification operation is performed to obtain a cryptographic key for the domain and mathematically operating on the cryptographic data, which is used to verify the authenticity, with the cryptographic key to obtain a first result;

compare the first result to another result;

and wherein the presenting of the indication of nonauthenticity occurs if the first result does not match the another result.

42. A method as in claim 41 wherein the cryptographic key is a public key of the domain which has a corresponding private key of the domain.

43. A machine readable non-transitory storage medium providing instructions which when executed cause a data processing device to perform a method comprising:

storing a plurality of identifiers at a client device as a client for a recipient address associated with a user using a display device of the client device to send and display emails having the recipient address, each of which corresponding to a portion of a full electronic messaging address, wherein the identifiers is locally accessible within the client device insulated from domain name system security attacks;

determining, at the client device, whether to perform a verification operation cryptographically based on public/private key cryptology on a first electronic message received at the client device to determine if the first electronic message is authentic using the plurality of identifiers, wherein the verification operation on the first electronic message are not performed if a sender address specified by a first electronic message addressed to the recipient address is outside domains specified by the plurality of identifiers;

presenting, on the display device of the client device, the first electronic message if the verification operation is determined not to be performed on the first electronic message;

performing the verification operation to determine if the first electronic message is authentic if the sender address is within a domain specified by the plurality of identifiers, the verification operation to determine whether the first electronic message includes cryptographic data having a domain name of the domain at the client device, the verification operation to determine if the first electronic message includes the cryptographic data, whether the first electronic message at the client device is authentically from an entity which controls the domain specified by the plurality of identifiers;

determining, at the data processing device, whether to enable the indication of nonauthenticity for the first electronic message, wherein the indication of nonauthenticity is disabled if the sender address is within a list of known addresses and wherein each of the list of known addresses is within the domains specified by the plurality of identifiers;

presenting, on the display device of the client device, the indication of nonauthenticity with the first electronic message if the indication is enabled; and in response to receiving a user instruction subsequent to the presentation of the indication, updating, at the client device, the list of known addresses with the sender address of the first electronic message, wherein the indication of nonauthenticity is disabled for a second electronic message from the sender address addressed to the recipient address.

44. A medium as in claim 43 wherein the instructions originate from a plug-in.

* * * * *